United States Patent
Kim et al.

(10) Patent No.: US 6,971,144 B2
(45) Date of Patent: Dec. 6, 2005

(54) METHOD FOR MANUFACTURING POLYURETHANE FOAM INJECTED WITH STRAND MATS AND DEVICE FOR INCREASING VOLUME OF THE STRAND MATS

(75) Inventors: Jong Sik Kim, Kyungsangnam-do (KR); Young Soo Kwon, Kyungsangnam-do (KR); Jung Meung Roh, Kyungsangnam-do (KR)

(73) Assignee: Han Kuk Fiber Glass Co., Ltd., Kyungsangnam-do (KR)

( * ) Notice: Subject to any disclaimer, the term of this patent is extended or adjusted under 35 U.S.C. 154(b) by 346 days.

(21) Appl. No.: 10/186,668

(22) Filed: Jul. 2, 2002

(65) Prior Publication Data

US 2003/0034578 A1 Feb. 20, 2003

(30) Foreign Application Priority Data

Jul. 5, 2001 (KR) .......................... 2001-40090

(51) Int. Cl.[7] .............................. D01G 15/00
(52) U.S. Cl. .................. 19/98; 19/106 R; 264/46.4; 425/112
(58) Field of Search ................. 264/46.4; 425/112; 19/98, 106 R

(56) References Cited

U.S. PATENT DOCUMENTS

| | | | |
|---|---|---|---|
| 4,279,060 A | * | 7/1981 | Wirth .................. 19/106 R |
| 4,475,271 A | * | 10/1984 | Lovgren et al. ............. 19/105 |
| 6,265,047 B1 | * | 7/2001 | Chapuis et al. ............. 428/111 |

* cited by examiner

Primary Examiner—Allan R. Kuhns
(74) Attorney, Agent, or Firm—Greenblum & Bernstein, P.L.C.

(57) ABSTRACT

A manufacturing method of a polyurethane foam injected with strand mats and a device for increasing the volume of the strand mats. The method comprises the steps of: increasing the volume of each of the strand mats to weaken the cohesion between glass fibers in each of the strand mats; continuously supplying and transferring the volume-increased strand mats; spraying a polyurethane foam solution on the continuously transferred strand mats; and foam molding the polyurethane foam solution in which the strand mats are immersed, into a polyurethane foam. Because the cohesion between the glass fibers in the strand mat is weakened and the volume of the strand mat is increased, the polyurethane foam solution uniformly permeates into the strand mats. As a result, the productivity of the polyurethane foam is improved and the variations in a variety of the mechanical properties are minimized.

3 Claims, 5 Drawing Sheets

Fig. 3
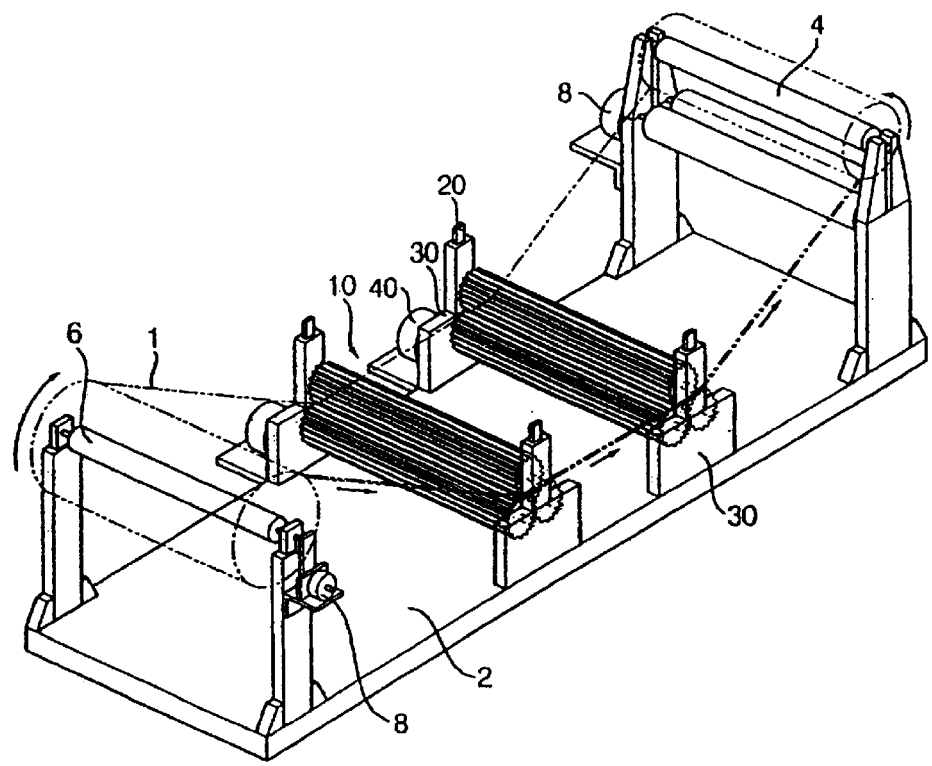
Fig. 4(A)
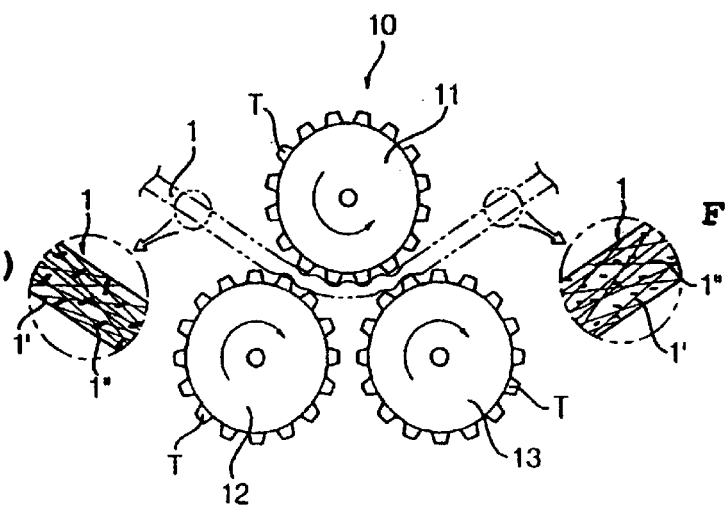
Fig. 4(B)    Fig. 4(C)

METHOD FOR MANUFACTURING POLYURETHANE FOAM INJECTED WITH STRAND MATS AND DEVICE FOR INCREASING VOLUME OF THE STRAND MATS

BACKGROUND OF THE INVENTION

1. Field of the Invention

The present invention relates to a polyurethane foam injected with strand mats, and more particularly to a method for manufacturing a polyurethane foam injected with strand mats, in which loss of the polyurethane foam is reduced and productivity thereof is improved, resulting from further comprising the step of increasing the volume of each of the strand mats to uniformly distribute the strand mats in the polyurethane foam, and a device for increasing the volume of the strand mats.

2. Description of the Related Art

Generally, polyurethane foam is a porous material in the form of sponge, produced by a chemical reaction of a polyol and an isocyanate, along with other additives. It is divided into a flexible polyurethane foam and a rigid polyurethane foam. The flexible polyurethane foam is used primarily as a cushioning material such as a matrix and the rigid polyurethane foam is utilized mainly as an insulating material. The present invention focuses on the rigid polyurethane foam used for an insulating material, and in particular, a method for manufacturing a polyurethane foam used as a cold-insulating material for a ship intended for transporting mainly a super-low temperature substance such as liquefied natural gas (LNG).

As shown in FIG. 1, a conventional manufacturing method of a polyurethane foam injected with strand mats comprises the steps of: continuously supplying and transferring the strand mats made with glass fiber, spraying a polyurethane foam solution on the strand mats so as to immerse the strand mats in the polyurethane foam solution, foam molding the polyurethane foam solution into a polyurethane foam after a designated time, and taking out the completed polyurethane foam from the manufacturing apparatus.

The strand mat is produced by binding glass fibers in the form of a solid powder of less than 25 microns with a polyester binder to maintain the shape of the mat. In this case, the amount of the polyester binder must be minimized within an extent that the shape of the mat is maintained. Generally, the polyester binder is used in the range of 1.3 to 3 weight % of the strand mat. If it is outside the above range, various problems may arise.

Specifically, if the amount of the polyester binder is too high, the cohesion between glass fibers in the strand mat increases and thus it is difficult to separate the glass fibers in the strand mat. As a result, when the polyurethane foam solution is sprayed and foam molded, the strand mats are not uniformly distributed in the molded polyurethane foam, thereby a poor quality of polyurethane foam being yielded. While, if the amount of the polyester binder is too small, the cohesion between glass fibers is too low to maintain the shape of a long-fiber mat.

Accordingly, when a polyurethane foam injected with strand mats is manufactured, the strand mats must be uniformly immersed in a polyurethane foam solution so as to be uniformly distributed in a produced polyurethane foam. Therefore, variations in the density, tensile strength, and compression strength between top and bottom layers in the polyurethane foam are reduced, thereby ensuring a uniform quality of the polyurethane foam and reducing quality defects in the interior of the polyurethane foam such as cracks.

However, as for the conventional method for manufacturing a polyurethane foam injected with strand mats, the strand mats are immersed in a polyurethane foam solution in a state wherein glass fibers in the strand mats are strongly bound. Therefore, the polyurethane foam solution cannot uniformly permeate into the glass fibers. As a result, air spaces are present in the produced polyurethane foam and thus the strength and the cold-insulating effect of the polyurethane foam are reduced.

In addition, the nonuniform distribution of strand mats in a polyurethane foam makes it possible to partially decrease the mechanical strength and heat insulating effect of the polyurethane foam. As a result, shrinkage, cracking, distortion and the like are caused in the polyurethane foam under a super-low temperature condition, or the polyurethane foam is liable to be broken by an external impact.

SUMMARY OF THE INVENTION

Therefore, the present invention has been made in view of the above problems, and it is an object of the present invention to provide a method for manufacturing a polyurethane foam injected with strand mats, in which shrinkage, cracking, distortion and the like do not occur under a super-low temperature such as less than −165° C., and impact resistance is improved, resulting from increasing the volume of each of the strand mats before spraying a polyurethane foam solution on the strand mats so as to weaken the cohesion between glass fibers forming the strand mats, to uniformly infiltrate the polyurethane foam solution into the strand mats, and to uniformly distribute the strand mats in the polyurethane foam, and a device for increasing the volume of the strand mats.

In accordance with one aspect of the present invention, the above object and other objects can be accomplished by the provision of a method for manufacturing a polyurethane foam injected with strand mats, comprising the steps of continuously supplying and transferring strands mats using multiple winding rollers, spraying a polyurethane foam solution on the strand mats, and foam molding the polyurethane foam solution in which the strand mats are immersed; wherein the improvement is characterized in that the step of increasing the volume of each of the strand mats is carried out before spraying the polyurethane foam solution on the strand mats, so as to weaken the cohesion between glass fibers forming the strand mat.

In accordance with another aspect of the present invention, there is provided a device for increasing the volume of the strand mat, consisting of a first roller with the strand mats made with glass fiber being wound therearound; a volume-increasing means with multiple compression rollers, applying pressure to each of the strand mats supplied from the first roller so as to weaken the cohesion between the glass fibers and increase the volume of the strand mat; a second roller, around which the volume-increased strand mats are wound; and a base, in which the first and second rollers, and the volume-increasing means are installed.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a perspective view showing a device for increasing the volume of each of the strand mats according to the present invention;

FIG. 4 is an exploded view showing an operating state of a volume-increasing means of FIG. 3;

DESCRIPTION OF THE PREFERRED EMBODIMENTS

Hereinafter, the preferred embodiments of the present invention will be described in detail with reference to the accompanying figures.

Figure 1:
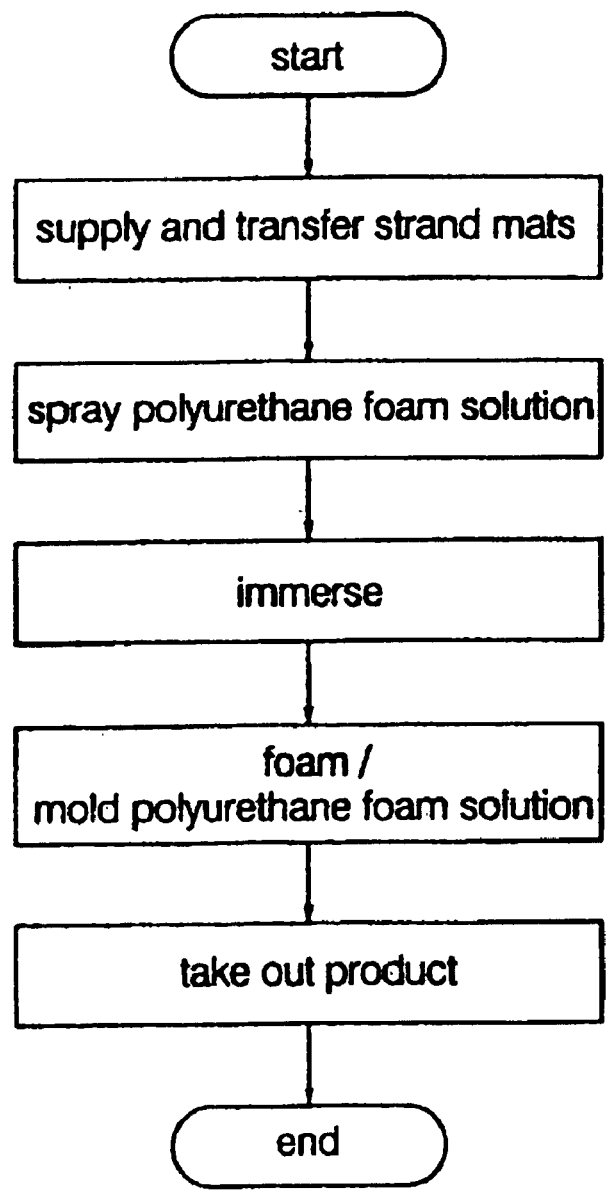
FIG. 1 is a block diagram showing a conventional method for manufacturing a polyurethane foam injected with strand mats.
Figure 2:
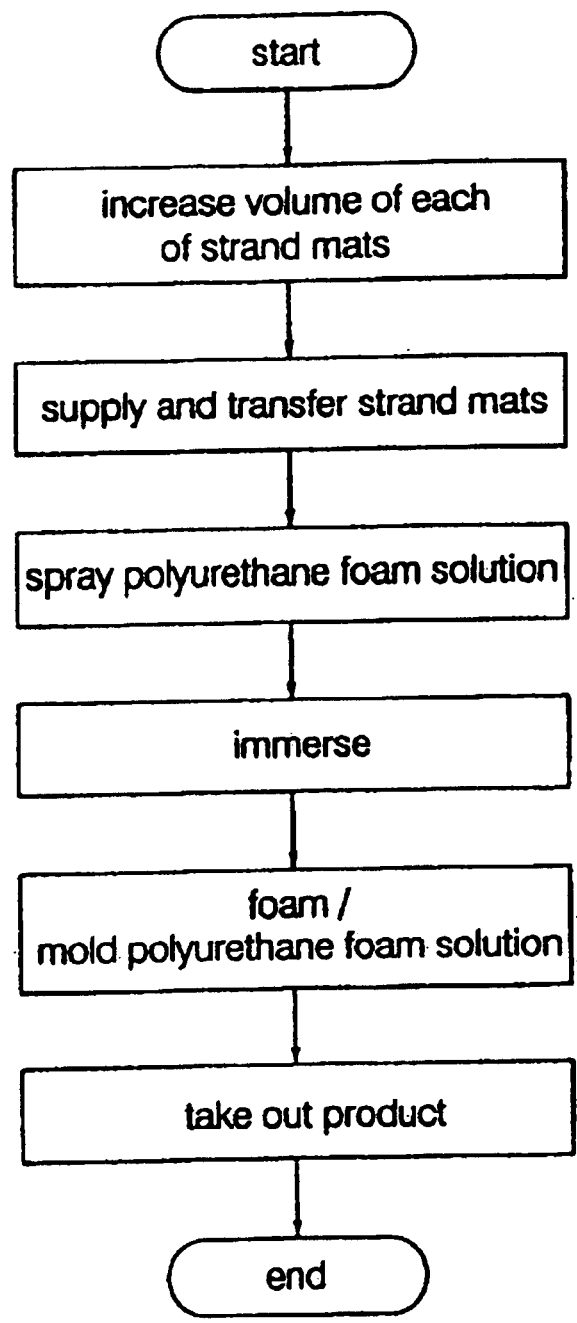
FIG. 2 is a block diagram showing an inventive method for manufacturing a polyurethane foam injected with strand mats.

As shown in FIG. 2, a manufacturing method of a polyurethane foam injected with strand mats according to the present invention comprises the steps of: increasing the volume of each of the strand mats to weaken the cohesion between glass fibers in the strand mat; continuously supplying and transferring the volume-increased strand mats from multiple winding rollers, around each of which the volume-increased strand mat is wound; spraying a polyurethane foam solution on the continuously transferred strand mats so as to immerse the strand mats in the polyurethane foam solution; foam molding the polyurethane foam solution with the strand mats being immersed therein, into a polyurethane foam; and taking out the completed polyurethane foam from the manufacturing apparatus.

Figure 5:
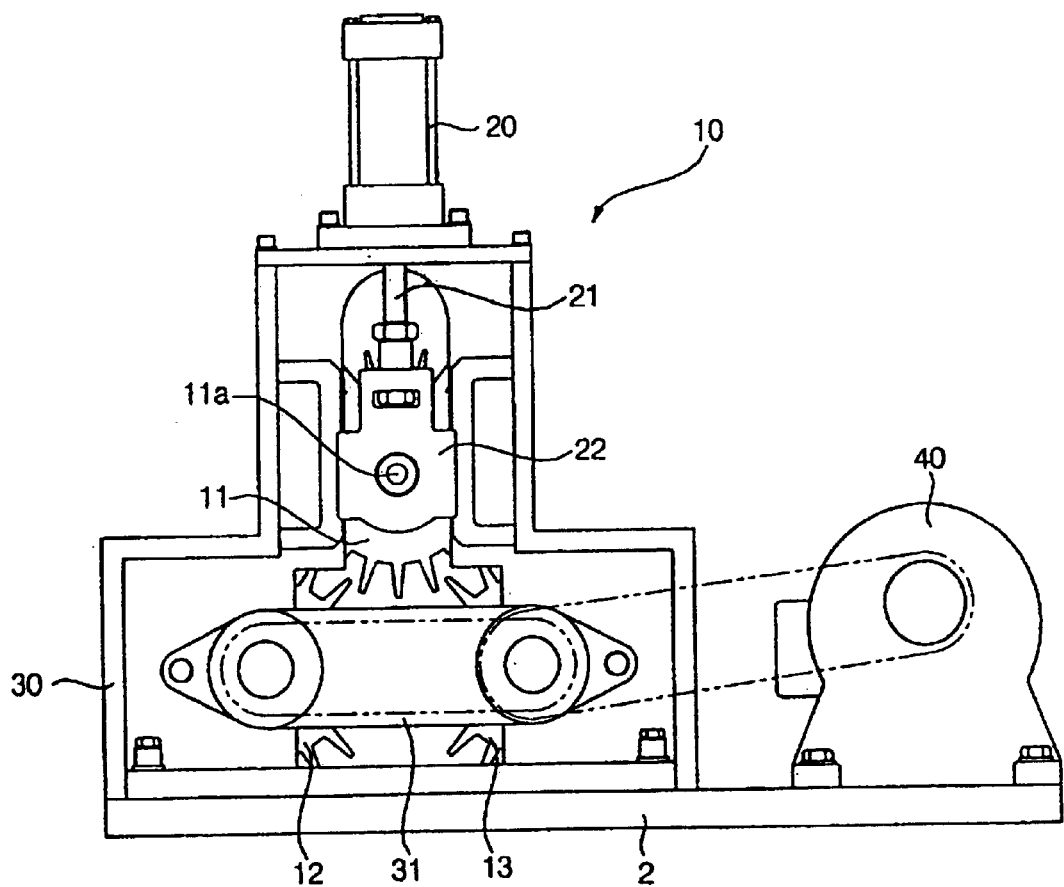
FIG. 5 is a left side view of a volume-increasing means of FIG. 3.

As shown in FIGS. 3, 4 and 5, the device for increasing the volume of each of the strand mats according to the present invention comprises a first roller 6, around which strand mats 1 made with glass fiber are wound; a volume-increasing means 10 with multiple compression rollers 11,12,13, applying pressure to each of the strand mats 1 passing between the compression rollers so as to weaken the cohesion between the glass fibers and thus increase the volume of each of the strand mats 1; a second roller 4, around which the volume-increased strand mats 1 are wound after passing through the volume-increasing means 10; a step motor 8, making the first roller 6 and second roller 4 rotate at an appropriate speed; and a basal plate 2, in which the first roller 6, second roller 4 and volume-increasing means 10 are installed.

The volume-increasing means 10 is installed in a manner such that some gear teeth (T) on one end of each of a group of the compression rollers are meshed with each other at a predetermined interval. In the present invention, three compression rollers 11, 12 and 13 are grouped.

FIG. 4 shows an aspect wherein the volume of the strand mat 1 is increased after passing through the volume-increasing means 10. Glass fibers 1' of the strand mat 1 are strongly bound with each other by a binder 1". The binder 1" is broken after passing through the compression rollers 11,12,13, whereby the cohesion between the glass fibers 1' is weakened and thus the volume of the strand mat 1 is increased.

FIG. 5 is a left side view of the volume-increasing means 10. The compression rollers of the volume-increasing means 10 is constituted of two driving rollers 12,13 which rotate at the same speed by a step motor 40, and a gap adjusting roller 11, which is installed in upper side of the driving rollers to be moved upward and downward. The driving rollers 12,13 are installed in a support 30 erected on the side of a basal plate 2 to be rotated, and are connected with each other by a transmission belt 31. The pin element 11a of the gap adjusting roller 11 is inserted in a slider 22 in such a way as to be rotated, and the slider 22 is installed in the support 30 to be moved upward and downward.

The slider 22 is connected to a piston load 21, which is raised and lowered by a hydraulic cylinder 20 installed in the upper side of the support 30. As the piston load 21 is raised and lowered, the slider 22 and the gap adjusting roller 11 are simultaneously raised and lowered. Based on this principle, the gaps between the compression rollers 11,12,13 are adjusted. Specifically, the degree of increase of the volume of the strand mat 1 passing between the compression rollers 11,12,13 can be varied by adjusting the gaps between the driving rollers 12,13 and the gap adjusting roller 11.

Figure 6:
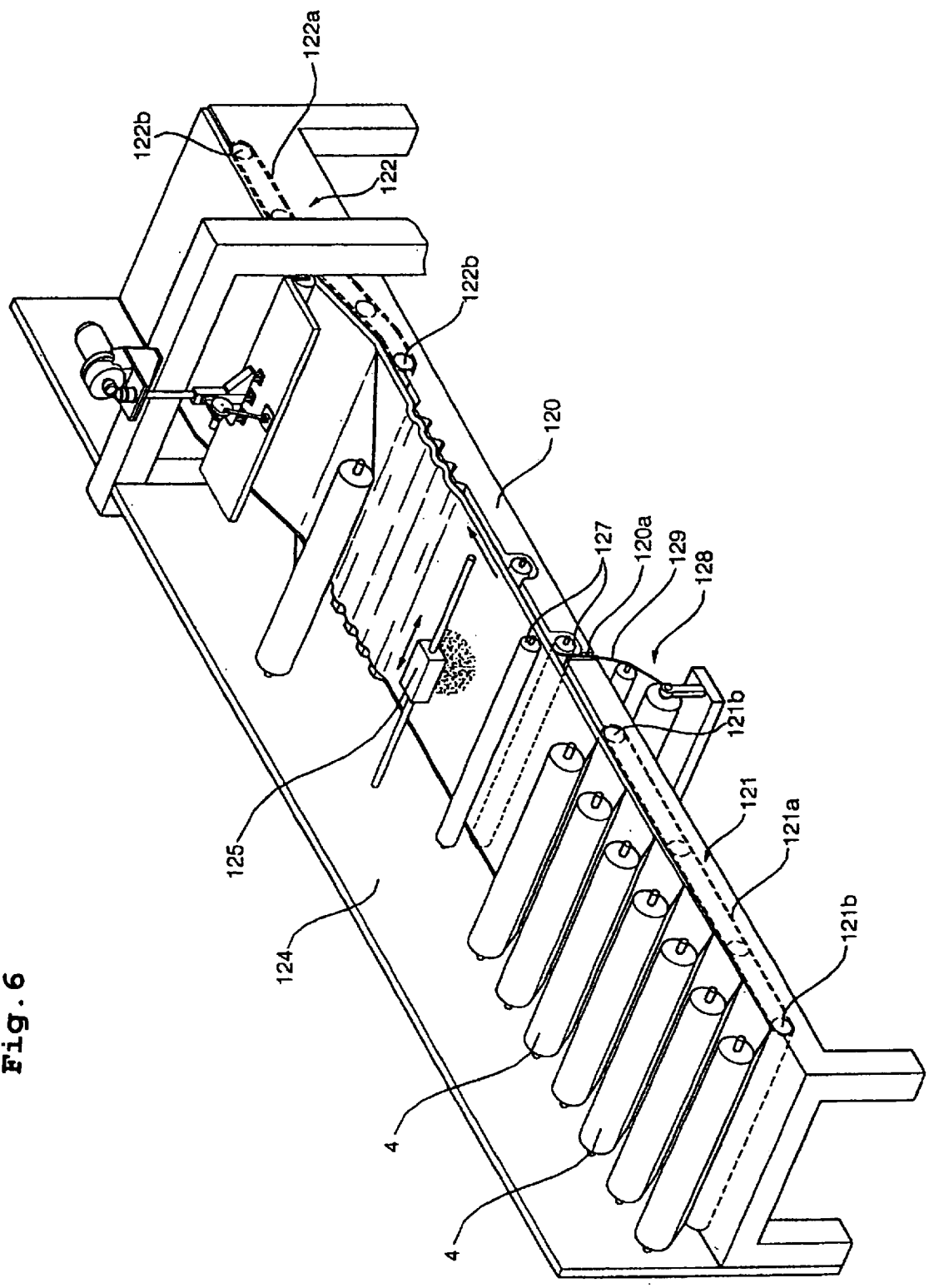
FIG. 6 is a perspective view showing an apparatus for manufacturing a polyurethane foam injected with strand mats.

In a method for manufacturing a polyurethane foam injected with strand mats according to the present invention, the volume of each of the strand mats is increased by the volume-increasing means shown in FIG. 3, and then the polyurethane foam is manufactured by an apparatus shown in FIG. 6.

Generally, the strand mats 1 are supplied while being wound around a winding roller. Accordingly, in the present invention, a first roller 6, around which the strand mats 1 are wound, is installed in the volume-increasing apparatus of the present invention. The strand mats 1 are transferred from the first roller 6 via a volume-increasing means 10 to a second roller 4. When a step motor 8 is operated, the first roller 6 and the second roller 4 rotate. As a result, the strand mats 1 are unwound from the first roller 6, pass between the compression rollers 11,12,13 of the volume-increasing means 10, and are wound around the second roller 4.

While each of the strand mats 1 passes through the volume-increasing means 10, the gear teeth (T) formed on the driving rollers 12,13 and the gap adjusting roller 11 compress the glass fibers 1' in the strand mat 1. Therefore, a binder 1", which binds the glass fibers 1' with each other, is broken. As a result, the cohesion between the glass fibers 1' is weakened and thus the volume of the strand mat 1 is substantially increased.

In this case, the gaps between the driving rollers 12,13 and gap adjusting roller 11 of the volume-increasing means 10 are adjusted by the hydraulic cylinder 20. If the gaps between the compression rollers vary, the amount of the broken binder varies. As a result, the degree of increase of the volume of the strand mat 1 which has passed through the volume-increasing means 10 varies. It is understood that the gaps between the compression rollers of the volume-increasing means 10 are permitted within an extent that the glass fibers 1' in the strand mat 1 are not damaged, and are adjusted according to the thickness of the strand mat 1. After the volume-increased strand mats 1 are sufficiently wound around the second roller 4, a polyurethane foam is molded by a manufacturing apparatus of the polyurethane foam.

A manufacturing apparatus of a polyurethane foam shown in FIG. 6 consists of a basal plate 120; multiple second rollers 4, which are installed in the side walls 124 erected on both sides of the basal plate 120, in such a way as to be rotated; a first conveyor 121, which is installed in front of the basal plate 120, and transfers the strand mats supplied from the second rollers; a polyurethane foam solution supply device 125, spraying the polyurethane foam solution on the strand mats transferred by the first conveyor 121; and a second conveyor 122, which is installed behind the basal plate 120 and pulls the foam solution-sprayed strand mats.

In the first conveyor 121 and the second conveyor 122, driving rollers 121b, 122b are installed at positions separated each other by a designated distance. The driving rollers 121b, 122b make conveyor belts 121a, 122a rotate, thereby the strand mats placed on the conveyor belts being transferred.

In addition, a passage 120a is defined in an approximately vertical orientation on the basal plate 120 at a position separated by a predetermined distance from an end of the first conveyor 121. A release paper supply device 128 is installed at the lower side of the basal plate 120 to supply a release paper 129 through the passage 120a. In order for the release paper 129 not to be crumpled, a guide roller 127 is installed in each of the upper and lower sides of the exit of the release paper supply device 128 to guide the supply of the release paper 129.

Hereinafter, the operating procedure of the apparatus for manufacturing the polyurethane foam shown in FIG. 6 will be described.

Volume-increased strand mats by the volume-increasing means shown in FIG. 3 are wound around multiple second rollers 4. The strand mats 1 supplied from the multiple second rollers 4 are laminated sequentially. The laminated strand mats 1 are transferred along the basal plate 120 by the first conveyor 121. When the strand mats 1 are transferred, the release paper 129 is supplied from the release paper supply device 128 and is placed at the lower side of the strand mats 1. Therefore, the strand mats 1 laminated as necessary, along with the release paper 129, are transferred to the lower side of the polyurethane foam solution supply device 125.

The polyurethane foam solution is sprayed on the strand mats 1 and release paper 129 by the polyurethane foam solution supply device 125 and permeates into the strand mats 1. In this case, the polyurethane foam solution is sprayed until it covers the uppermost layer of the strand mats 1 so as to immerse the strand mats 1 in the polyurethane foam solution. The release paper 129 placed at the lower side of the strand mats 1 prevents direct contact between the polyurethane foam solution and the upper surface of the basal plate 120. Furthermore, when the polyurethane foam solution is foam molded into a polyurethane foam, the release paper 129 becomes one part of the polyurethane foam and constitutes the packaged one surface of the polyurethane foam.

The polyurethane foam solution sprayed on the strand mats 1 is foam molded by a chemical reaction of an isocyanate and a blowing agent after 30 to 80 seconds. Because the polyurethane foam solution is foam molded in a state wherein the polyurethane foam solution sufficiently permeates into the volume-increased strand mats 1, the produced polyurethane foam has uniformly distributed strand mats 1.

As described in the above, the present invention uses glass fiber reinforcement in order to increase the mechanical strength and super-low temperature stability of the polyurethane foam. In this case, with a result of improving degree of distribution of the glass fibers, the variation in the mechanical strength and physical properties between the layers of the polyurethane foam, and the product loss caused by the poor distribution of the mechanical strength and the physical properties are reduced. Therefore, increased productivity of the polyurethane foam is accomplished. These improvements are demonstrated through the examples below and the results are presented in Table 1 below.

EXAMPLES

Examples are different in the composition ratio of a polyurethane foam solution and the number of passages of a volume-increasing means. In Table 1, CSM means continuous strand mat.

Comparative examples 1 and 2 are polyurethane foams, each manufactured by spraying a polyurethane foam solution with a composition ratio (weight ratio) of polyol: isocyanate: blowing agent of 100:110:0.9 or 100:130:0.92 on 7-layered strand mats, and foam molding the polyurethane foam solution without passing through the volume-increasing means of the present invention. The distribution states of their strand mats were not uniform and deviated from the standard. The density difference between the top and bottom layers of the polyurethane foam was more than 7 kg/m$^3$. Also, the variations in the physical properties were large, for example, the compression strength varied more than 0.094 kg/cm$^2$, and the room-temperature tensile strength varied more than 0.077 kg/cm$^2$.

Example 1 is a polyurethane foam manufactured after once passing its strand mats through the volume-increasing means of the present invention. It was satisfactory in terms of values of standard average physical properties, on the whole. Specifically, the density difference between the top and bottom layers of the polyurethane foam was lowered to 4 kg/m$^3$, and the variations in the compression strength and room-temperature tensile strength were lowered to 0.077 kg/cm$^2$ and 0.063 kg/cm$^2$, respectively, so as to exhibit almost uniform physical properties. In particular, judging from the fact that the tensile strength variation at a low temperature of −170° C. was 0.051 kg/cm$^2$, it can be seen that the physical properties of the polyurethane foam are almost uniform.

Example 2 is a polyurethane foam manufactured after twice passing its strand mats through the volume-increasing means of the present invention. The variations in the compression strength and room-temperature tensile strength were 0.075 kg/cm$^2$ and 0.061 kg/cm$^2$, respectively, which were much less than those of the polyurethane foam of example 1. The tensile strength variation at a low temperature of −170° C. was 0.047 kg/cm$^2$, which was less than that of the polyurethane foam of example 1.

TABLE 1

|  |  | Comp. 1 | Comp. 2 | Example 1 | Example 2 |
| --- | --- | --- | --- | --- | --- |
| Composition | Polyol | 100 | 100 | 100 | 100 |
| ratio | Isocyanate | 110 | 130 | 130 | 130 |
|  | Blowing agent (water) | 0.9 | 0.92 | 0.9 | 0.9 |

TABLE 1-continued

|  |  |  | Comp. 1 | Comp. 2 | Example 1 | Example 2 |
|---|---|---|---|---|---|---|
| Number of layers of CSM |  |  | 7 | 7 | 7 | 7 |
| Free foam density (kg/m$^3$) |  |  | 105.2 | 104.4 | 104.8 | 105.4 |
| Product density (kg/m$^3$) |  | Top layer | 121.01 | 121.33 | 123.31 | 124.22 |
|  |  | Bottom layer | 128.97 | 128.33 | 127.31 | 127.75 |
| Physical properties | Compression strength (kg/cm$^2$) | 20° C. | 1.21 | 1.24 | 1.35 | 1.39 |
|  |  | Variation | 0.094 | 0.097 | 0.077 | 0.075 |
|  | Tensile strength (kg/cm$^2$) | Room temperature | 2.34 | 2.49 | 2.67 | 2.71 |
|  |  | Variation | 0.077 | 0.079 | 0.063 | 0.061 |
|  |  | −170° C. | 2.76 | 2.73 | 3.81 | 3.93 |
|  |  | Variation | 0.061 | 0.068 | 0.051 | 0.047 |
|  | Distribution of strand mats |  | Nonuniform | Nonuniform | Uniform | Uniform |
|  | Shearing strength (kg/cm$^2$) | Length, width | 1.01 | 0.97 | 1.32 | 1.38 |
|  |  | Thickness | 1.23 | 1.27 | 1.45 | 1.50 |
| Number of passages of CSM volume-increasing means |  |  | 0 | 0 | 1 | 2 |

As apparent from the above description, the present invention provides a method for manufacturing a polyurethane foam injected with strand mats and a device for increasing the volume of each of the strand mats, weakening the cohesion between glass fibers in each of the strand mats before immersing the strand mats in a polyurethane foam solution so as to sufficiently infiltrate the polyurethane foam solution into the strand mats and uniformly distribute the strand mats in the polyurethane foam. As a result, the polyurethane foam useful as a heat insulating material can be obtained, in which shrinkage, cracking, distortion and the like are prevented, and the impact resistance is improved, even under a super-low temperature such as less than −165° C.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for increasing the volume of strand mats, comprising:
    a first roller, around which the strand mats made with glass fibers are wound;
    a volume-increaser that applies pressure to each of the strand mats supplied from the first roller so as to weaken the cohesion between the glass fibers and increase the volume of each of the strand mats;
    a second roller, around which the volume-increased strand mats are wound;
    wherein the volume-increaser comprises multiple compression rollers, between which each of the strand mats supplied from the first roller is passed in a state of being compressed,
    and wherein at least one of the compression rollers comprises a driving roller which is rotated by a motor, and a gap adjusting roller which is provided at an upper side of the driving roller to be moved upward and downward.

2. The device as set forth in claim 1, wherein the compression rollers are formed with gear teeth.

3. The device as set forth in claim 1, wherein the gap adjusting roller is installed in a slider to be rotated, the slider being installed in a support in which the driving roller is installed, to be moved upward and downward, and being raised and lowered by a hydraulic cylinder installed in an upper side of the support.

* * * * *